May 31, 1960    A. SPIELMAN    2,938,282
SPELLING AID
Filed July 17, 1958

Abe Spielman
INVENTOR.

BY *Clarence A. O'Brien*
*and Harvey B. Jackson*
Attorneys

United States Patent Office

2,938,282
Patented May 31, 1960

2,938,282
SPELLING AID

Abe Spielman, 414 W. 44th St., New York, N.Y.

Filed July 17, 1958, Ser. No. 749,185

1 Claim. (Cl. 35—35)

The present invention generally relates to an educational aid and more particularly to a device for aiding children in spelling and incorporates in its construction a convenient receptacle for pencils, rulers or the like which are normally employed by school children and which are subject to easy misplacement.

The primary object of the present invention is to provide a spelling aid including a stationary series of letter combinations together with a movable series of letters for alignment with selective series of stationary letters for forming words thus aiding in the teaching of the orientation of letters in words and generally aiding in the child learning various rules of spelling as well as rendering the art of spelling entertaining and attractive to the child so that the child will develop more interest in spelling thus increasing the child's ability to spell as well as his desire to learn more about spelling.

Another feature of the present invention is the provision of a pencil box having the top thereof provided with a stationary portion and a slidable portion with each portion having letters thereon for association of the letters for forming words or the like in which the slidable part of the top also facilitates access to the interior of the pencil box for removal of pencils or placement of pencils therein while also providing an aid in spelling.

Yet another object of the present invention is to provide a spelling aid in the form of a receptacle having a stationary top part and a movable top part with letters thereon which is extremely simple in construction, easy to use, effective for purposes of holding pencils and the like and for aiding in spelling and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
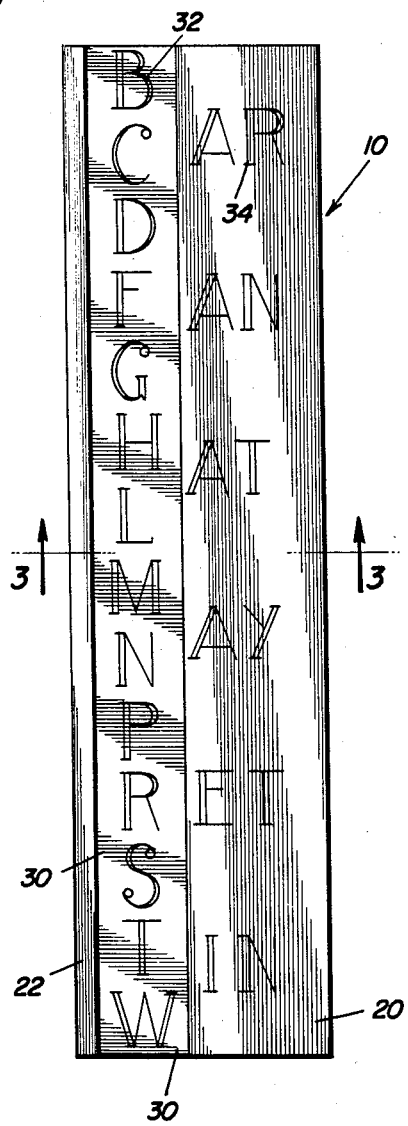
Figure 1 is a plan view of the spelling aid of the present invention illustrating the stationary top and the slidable top and the letters disposed thereon for forming words with the slidable top shown in closed position.
Figure 2:
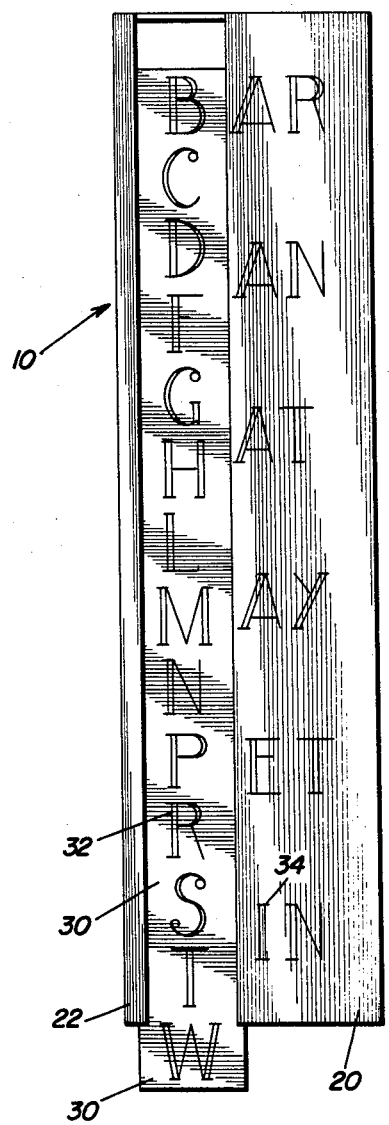
Figure 2 is a plan view similar to Figure 1 but with the slidable part of the top shown in a position for forming a word with the uppermost letters on the stationary part of the top.
Figure 3:
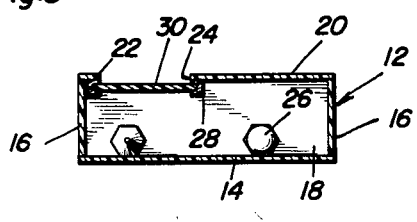
Figure 3 is a transverse, vertical sectional view taken substantially upon a plane passing along section line 3—3 of Figure 1 illustrating the details of construction.

Referring now specifically to the drawings, the numeral 10 generally designates the spelling aid of the present invention which is in the form of an elongated receptacle generally designated by the numeral 12 and including a flat rectangular and elongated bottom 14 and upstanding side walls 16 and upstanding end walls 18. Interconnecting the end walls and integral with one side wall 16 is a stationary top member 20 which covers substantially one-half of the top area of the receptacle 12. An inwardly extending flange 22 is provided at the top of the other side wall 16 and is in opposition to the stationary top wall 20. Between the top wall 20 and the flange 22 there is an elongated slot-like opening 24 forming an entrance into the receptacle so that pencils 26 or rulers or any other objects may be deposited into the receptacle 12 or removed therefrom by employing the slot 24.

Each edge of the slot 24 is defined by a longitudinally extending inwardly facing track 28 generally in the form of a channel-shaped member having the channel opening towards each other whereby the channel-shaped members 28 disposed horizontally form side tracks or grooves for receiving a slidable top or closure member 30 which forms a closure for the entrance slot 24 for retaining the pencils 26 or the like therein.

Disposed on the upper surface of the slidable closure member or plate 30 is a series of longitudinally spaced letters 32. Disposed on the stationary top member 20 is a plurality of series of letters 34 which may be a single letter, two letters, three letters or more for association with a letter 32 for forming a word by virtue of the sliding movement of the closure plate 30 for alignment with the various letters 32 with any of the series of letters 34. Each of the letters 32 may be aligned with the various series of letters for forming various words and for aiding in the teaching of the spelling of words.

The entire device may be constructed of plastic material which renders the device relatively inexpensive to manufacture and the channel-shaped member 28 may be adhesively secured in position or may be made integrally with the remainder of the structure. The size relationship of the letters may vary with it only being necessary that the letters are easily read and easily aligned and it also is within the purview of the present invention to provide letters on either side of the sliding closure member 30 so that the same may be inverted for additional use. As shown in the drawing, the letters 32 on the member or plate 30 are spaced closer together longitudinally of said member or plate 30 than the spacing of the letters 34 longitudinally of the top member 20. This makes it easier for children to pick out the letters 34 in aligning the letters 32 therewith.

With the present invention, the stationary top member 20 and the movable top member 30 can be formed by sliding movement of the closure member 30 in relation to the letters 34. Sliding movement of the closure member 30 also provides access into the interior of the pencil box 12 for providing access to the pencils 26 and also for permitting removal thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A spelling aid comprising an elongated receptacle including an elongated flat bottom, upstanding side walls and end walls rigid with said bottom, a stationary top member rigid with the end walls and one side wall, said stationary top member covering substantially one-half of the top area of the receptacle, an inwardly extending flange rigid with the end walls and the other side wall and extending inwardly towards the inner edge of the top member, the inner edges of the flange and top member being disposed in spaced parallel relation and forming an entrance slot for the receptacle, the inner edge of the flange having a depending inwardly facing U-shaped track rigid therewith, the inner edge of the top member having a depending inwardly facing U-shaped track rigid therewith, an elongated closure member slidably received in said tracks, said end walls having notches aligned with the slot and slidably receiving said closure member, said closure member having a constant cross-sectional area with the side edges being received in the tracks, said stationary top member having a plurality of groups of alphabetical letters thereon in longitudinal spaced relation, each group of letters including a plurality of horizontally aligned letters forming a word when combined with one of a plurality of other letters, said movable closure member having a row of alphabetical letters thereon in longitudinal spaced relation, said row of letters on the movable closure member including a plurality of letters combined with each group of letters on the stationary member for forming a plurality of words by selectively combining the letters on the closure member with the groups of letters on the top member, the spacing of the letters on the closure member being less than the spacing between the groups on the top member to facilitate alignment of the letters on the closure member with those on the top member.

References Cited in the file of this patent

UNITED STATES PATENTS

| | | |
|---|---|---|
| 1,224,742 | Hillyer | May 1, 1917 |
| 1,285,038 | Chance | Nov. 19, 1918 |
| 2,804,198 | Rekonty | Aug. 27, 1957 |

FOREIGN PATENTS

| | | |
|---|---|---|
| 1,039,427 | France | May 13, 1953 |